United States Patent [19]

Allison et al.

[11] Patent Number: 4,484,342
[45] Date of Patent: Nov. 20, 1984

[54] ENDODONTIC HOLDER

[75] Inventors: Kenneth L. Allison, Claremont; Helio Gomez, So. Pasadena; Robert Manchego, Azusa, all of Calif.

[73] Assignee: Xerox Corporation, Stamford, Conn.

[21] Appl. No.: 465,988

[22] Filed: Feb. 14, 1983

[51] Int. Cl.³ .............................................. G03B 41/16
[52] U.S. Cl. .................................... 378/168; 378/205
[58] Field of Search ................ 378/168, 169, 170, 205

[56] References Cited

U.S. PATENT DOCUMENTS

| | | |
|---|---|---|
| 1,706,117 | 3/1929 | Heckel . |
| 2,075,491 | 10/1933 | Wilson . |
| 2,240,336 | 5/1941 | Kreider . |
| 2,522,201 | 9/1950 | Stern ..................................... 378/170 |
| 3,356,845 | 12/1967 | Bergendal . |
| 3,936,643 | 2/1976 | Toner . |
| 4,251,732 | 2/1981 | Fried . |

Primary Examiner—Alfred E. Smith
Assistant Examiner—T. N. Grigsby
Attorney, Agent, or Firm—Robert E. Cunha

[57] ABSTRACT

This invention is a plastic holder for holding a rigid photoreceptor in the mouth during the creation of dental bitewing and periapical x-ray images, and more particularly is a one-piece plastic holder comprising (1) a bitewing holder comprising a backing plate, a tab and two gripping members for holding the photoreceptor in secure contact with the backing plate, (2) a periapical holder comprising a backing plate and a gripping member for holding the photoreceptor in secure contact with the backing plate, and (3) a handle in the form of a plastic strip connecting the two holders.

4 Claims, 2 Drawing Figures

ENDODONTIC HOLDER

The invention is a plastic holder for holding a rigid photoreceptor in the mouth during the creation of dental bitewing and periapical x-ray images, and more particularly is a one-piece plastic holder comprising (1) a bitewing holder comprising a backing plate, a tab and two gripping members for holding the photoreceptor in secure contact with the backing plate, (2) a periapical holder comprising a backing plate and a gripping member for holding the photoreceptor in secure contact with the backing plate, and (3) a handle in the form of a plastic strip connecting the two holders.

In the typical dental office procedure, x-ray images of the mouth are taken using dental x-ray film manufactured by Kodak. For a bitewing, the film is typically held in place during exposure time by a cardboard bite holder manufactured by Green Dental Products which has a loop section into which the film fits, and a bite tab section which the patient bites onto. For a periapical image, the film is most commonly positioned by the operator and held in place by hand by the patient.

The disadvantages of this system are that the development of the film is inconvenient and time consuming, and the film and holder must be discarded after one use.

The prior art in the area of endodontic imaging includes the Precision Film Holders made by Issac Masel Co., Philadelphia, Pennsylvania. They are made of chrome plated metal and come in sets of four to accommodate various film positions. These holders are mounted on the cone of the x-ray generator, the film is gripped by the holder at a distance of several inches from the cone, and then the entire apparatus is positioned so that the film is in the proper position in the patient's mouth. This apparatus results in precise images but is bulky and inconvenient for the operator.

In a more recently developed system, the film is replaced by a xeroradiographic selenium photoreceptor plate which is charged to between 2,000 and 4,000 volts prior to use, and is then discharged to form a dental image in the usual way by exposure to x-rays. To prevent discharge by ambient light, the plate is fitted with a light-proof cover to form a cassette; and to prevent cross contamination by the transfer of saliva between patients, the cassette is enclosed in a plastic disposable sanitary bag with an adhesive closure during the time it is in the patient's mouth. The advantages of this system are lower cost because the plates are reusable and greater convenience because the plates are developed automatically. The holder is particularly effective because it facilitates proper positioning during the endodontic procedure.

A structural difference is that the cassette is rigid, as compared to the flexible construction of x-ray film. Therefore, while this cassette could be held in position in the mouth of the patient, either by a precision holder, typical cardboard holder or by the patient's finger, it has been found to be advantageous for two reasons to provide a plastic holder instead, the holder comprising a handle in the form of a plastic strip with a bitewing holder on one end and a periapical holder on the other. The bitewing holder comprises a backing plate and gripping members for holding the cassette and the periapical holder comprises a backing plate and one gripping member which clamps onto one end of the cassette. This composite holder is a lower cost alternative to the prior art because the holder is reusable, and provides more reliable detail in the x-ray images because the fairly rigid plastic holder results in a smaller likelihood of movement of the cassette during exposure. The endo holder is much easier to place intra orally during endodontic procedures, because the patient can hold the cassette in better position.

This invention can be discussed in more detail with reference to the following drawings.

Figure 1:
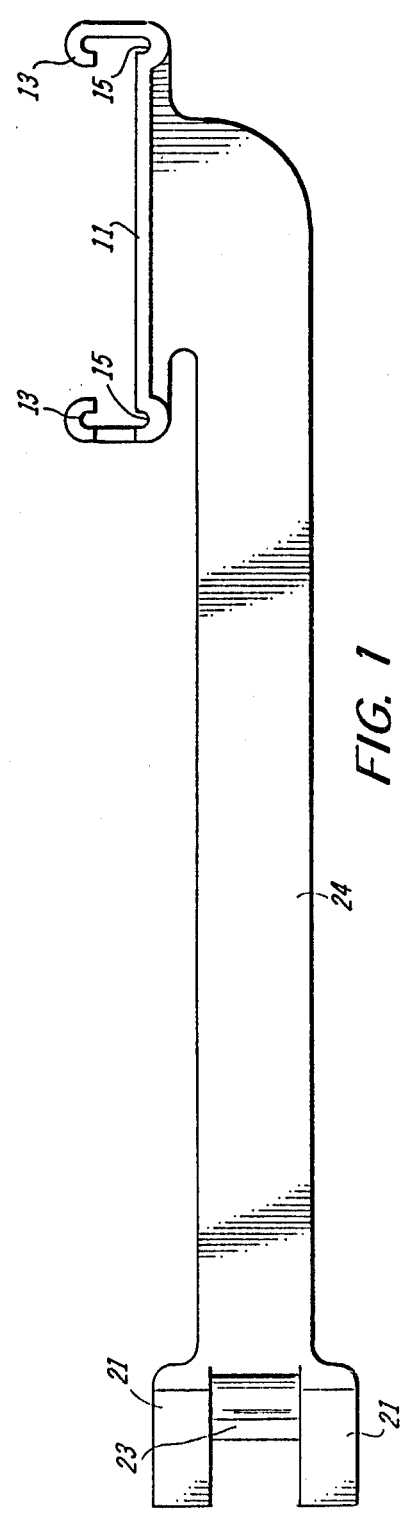
FIG. 1 is a front view of the holder.
Figure 2:
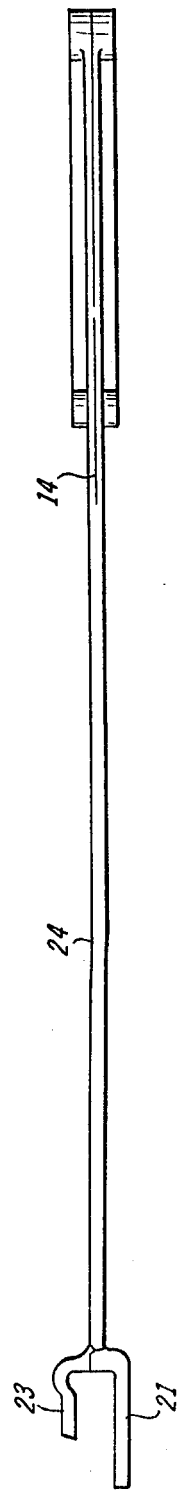
FIG. 2 is a side view of the holder.

The holder of FIGS. 1 and 2 is used in conjunction with a rigid cassette with a length and width of approximately 1 9/16×1 3/16 inches. The thickness of the cassette of approximately 170–180 thousandths compares with 40–50 thousandths for film. The cassettes are the same size as x-ray film and are used in the usual intra oral positions.

In order to properly image the bitewing and periapical xeroradiographs, this holder has been designed to hold the cassette in position so that the central x-ray beam is perpendicular to the plate. Unlike film which is pliable and conforms easily to the intra oral cavity configuration, the stiff cassette must be rigidly held without intra oral support.

The necessary characteristics of the holder are as follows. It should hold the cassette rigidly, preventing movement during exposure; the plastic should be radiolucent; the plastic may be autoclavable or cold sterilized; it should be comfortable for the patient; excess force should not be required to insert the cassette into the holder; the cassette should not slip in the holder during exposure; and the plastic must be FDA approved.

The holder of FIGS. 1 and 2 satisfies these requirements. The holder is manufactured from clear, flexible, FDA approved polyethelene. The backing plates 11, 21 and gripping members 13, 23 are rigid enough to hold the cassette firmly, and the plastic is durable enough to last for at least five hundred exposures and sterilizations.

The plastic of choice is polyethelene, a thermoplastic. This material flows well during the injection molding process, is resilient, will spring back to its original shape when released, and can be machined if necessary. Polycarbonate and thermoset plastics are not as usable because they are harder than the preferred polyethelene.

The gripping members 13 at each end of the backing plate 11 of the bitewing portion of the holder are shaped as shown to enable a flexible snapping action. In FIG. 1, the plane of the cassette after insertion would be perpendicular to the page. The insertion process is to first place one edge of the cassette into engagement under one gripping member 13, and then, pushing down, snapping the other end of the cassette into place under the other gripping member. As an alternative, the cassette could be inserted by initially placing both edges of the cassette in engagement under the gripping members 13 and then sliding the cassette into a centered position, but this is the less desirable method because it would be more likely to tear the protective plastic bag which encloses the cassette during use.

At the periapical portion of the holder, the cassette end is simply forced between the backing plate 21 and the gripping member 23.

In the preferred embodiment, the distance between gripping members 13 is about five thousandths less than the width of the cassette to ensure an interference, or press fit. The distance between the backing plate 21 and gripping member 23 is about the same dimension as the cassette thickness, but a tight fit results because of the two included thicknesses of the protective plastic bag. Also, a taper outward from the center line 14 of FIG. 2 is about one half degree, or one thousandth of an inch, and was found to aid in releasing the material from the mold.

The thickness of the handle 24, all backing plates 11, 21 and gripping members 13, 23 are roughly equal along their entire length which ensures that the cooling cycle in the molding process will be accomplished fairly evenly and quickly. This thickness is about sixty thousandths of an inch in this described embodiment.

The gap 15 between each gripping member 13 and the backing plate 11 enables a greater flexibility to aid in the snapping-in of the cassette.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

We claim:

1. Endodontic holder means for holding two rigid bitewing x-ray photoreceptor cassettes, each cassette enclosed in a plastic bag, comrising a single unit of plastic formed into a handle, a first cassette holder comprising a first rigid backing plate and two gripping members formed at one end of said handle portion, and a second cassette holder comprising a second rigid backing plate and a gripping member formed at the other end of said handle, a gripping member attached to each end of said first backing plate and positioned to grip one edge of the cassette to hold the cassette flat against the first backing plate, said first backing plate having its plane in line with the length of the cassette, said gripping members being slightly flexible and having surfaces opposite said first backing plate sloping toward said first backing plate so that a cassette edge pressed against said sloping surfaces will snap into contact with said first backing plate with the length of the backing plate in parallel with the plane of the cassette without testing said plastic bag, said second backing plate formed at the other end of said handle portion with its plane parallel to the length of said handle portion, and said gripping member being slightly flexible and having a flat surface parallel to said second backing plate so that a cassette edge pressed into the space between said second backing plate and said gripping member will be held firmly.

2. The endodontic holder of claim 1 wherein the plastic is a thermoplastic.

3. The endodontic holder of claim 2 wherein the thermoplastic is polyethelene.

4. The holder of claim 3 wherein said first backing plate has a section of reduced thickness at the points of attachment of said gripping members to allow said gripping members to be flexible.

* * * * *